Patented Jan. 7, 1930

1,742,623

UNITED STATES PATENT OFFICE

JOHN F. TURNER, DAVID H. MATTHEWS, AND M. FRANK ROSS, OF OLEAN, NEW YORK, ASSIGNORS TO VACUUM OIL COMPANY, OF NEW YORK, N. Y., A CORPORATION OF NEW YORK

DEMULSIFYING SOAP AND PROCESS FOR PRODUCING IT

No Drawing.    Application filed November 30, 1927. Serial No. 236,877.

This invention relates to a new demulsifying soap and the process for producing it.

Demulsifying soaps derived from the sludge resulting from the treatment of petroleum and petroleum distillates, and also those derived from the residuum resulting from the distillation of petroleum, usually contain coloring matter that is soluble in oil. When such soaps are used in the treatment of oils of light color the oil-soluble coloring matter dissolves in the oil under treatment, darkening it, and leaving it in such condition that the oil must subsequently be subjected to clay treatment for the removal of the color, under conditions that make that process both costly and difficult to accomplish. Furthermore, an oil treated with such soaps has small resistance to emulsification with water.

By this new process a demulsifying soap is produced that is free from coloring matter that is soluble in an oil. Accordingly, when this soap is used in connection with the familiar acid treatment of light color oils the treated oils are not darkened, and can be filtered more effectively and also more cheaply. Furthermore, the filtered oil will have a resistance to emulsification.

In the practice of this invention the acid sludge containing unspent acid, sulfonated substances, sulfo-acids, asphaltic bodies, tars, and polymers, resulting from the treatment of petroleum, petroleum distillates or residuum derived from the distillates of petroleum, with concentrated or fuming sulfuric acid, or any strong acid equivalent thereto is after being separated from the reacting oil, pumped into a tank provided with suitable connections for the introduction of air, water and steam, and with a steam coil for heating.

The unspent acid is removed as usual from the acid sludge by adding water to it and then removing the water. When the unspent acid is nearly exhausted, open steam is preferably introduced and the acid sludge and remaining water heated, say to 212° F. On remaining undisturbed for a sufficient time, say for one-half hour to one hour, two layers form. There will be found an upper layer composed of slude of a viscous, liver-like nature, and a lower aqueous layer, containing the remainder of the unspent acid and any water-soluble acids that may have been produced by hydrolyzation during the steaming operation. The lower aqueous layer is removed by suitable means, leaving for alkaline treatment the viscous sludge described as liver-like.

Sodium hydroxide, preferably of 30° Beaumé strength is preferably used to neutralize the liver-like mass, and is preferably added while the latter is being agitated. This is continued until the sludge takes on a reddish-brown color, when it will be found to be neutral or slightly alkaline. Although sodium hydroxide is preferred for this purpose, any alkali metal or ammonium salt may be used, which by reaction with the acidic constituents present in the liver-like mass will make the same neutral or slightly alkaline.

After the acid sludge in the form of the liver-like mass described above has been washed and neutralized as aforesaid, there is added to it "milk water" or "white water", to be hereinafter defined, until the mass becomes fluid, that is to say, losses its liver-like nature. This usually occurs when the mixture turns a dark, grayish color. Next, the dark, grayish mixture is heated with closed steam until it comes to a boil. On standing undisturbed three layers form, namely, an upper oily layer, a middle layer of black, viscous, thick material, and a lower aqueous layer which contains in solution or suspension the demulsifying soap, and which is removed.

The dehydrated material derived from this aqueous solution is neutral or slightly alkaline and contains products that are novel for the purposes for which demulsifying soaps are employed.

So-called "milk water" or "white water" hereinbefore referred to as made use of in one of the steps of the process described for producing the demulsifying soap, is derived from the acid treatment of the oil first described above. When the oil after having been acid treated is pumped away leaving the acid sludge, as described above, the oil itself is neutralized and then washed. It is the water that has been used for this washing that is the so-called "milk water" or "white water" employed in this process as described above. This water has taken into solution or suspension alkali metal or ammonium sulfates and sulfonates and salts of petroleum acids, depending upon what substance or substances were used in the process of neutralization.

What we claim as our invention and desire to secure by Letters Patent is:

1. The method of manufacturing a demulsifying agent which comprises adding to the washed and neutralized acid sludge, formed by the acid treatment of petroleum products, the so-called "white water" obtained by washing with water a mineral oil that has been treated with a strong acid and alkali, and skimming off the supernatant liquor which contains the coloring matter.

2. The method of manufacturing a demulsifying soap which comprises treating a mineral oil with a strong acid to precipitate acid sludge therefrom, separating the precipitated sludge from the body of oil, washing the sludge, heating the washed sludge with open steam, settling and removing the aqueous portion thereof, neutralizing the remainder thereof, treating with so-called "white water", and removing the layer containing in solution and in suspension the demulsifying soap.

JOHN F. TURNER.
DAVID H. MATTHEWS.
M. FRANK ROSS.